Dec. 22, 1931.  C. A. BUDNIK  1,837,525
DAM BUILDING TOWER
Filed Oct. 21, 1929  4 Sheets-Sheet 1
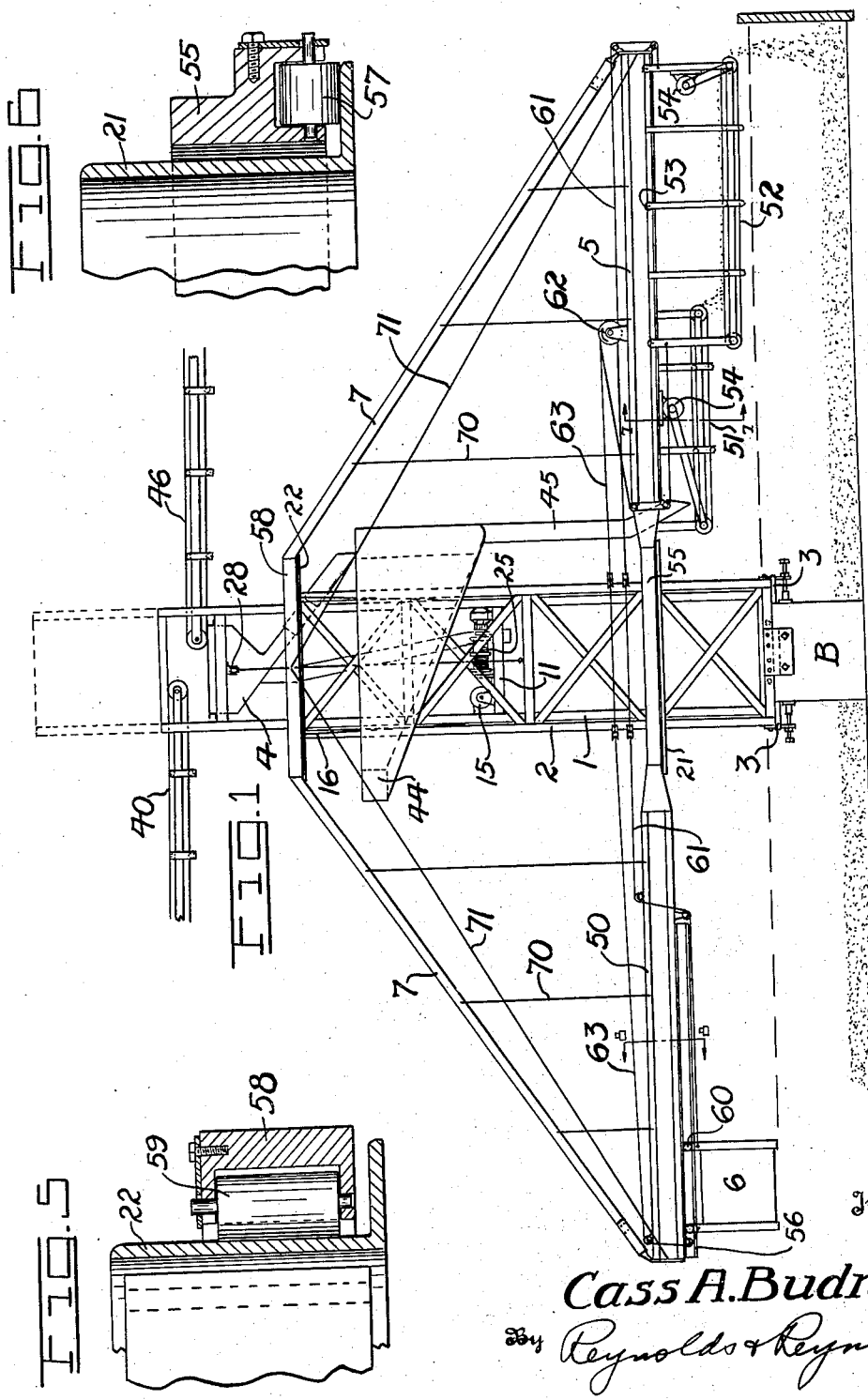
Inventor
Cass A. Budnik
By Reynolds & Reynolds
Attorneys

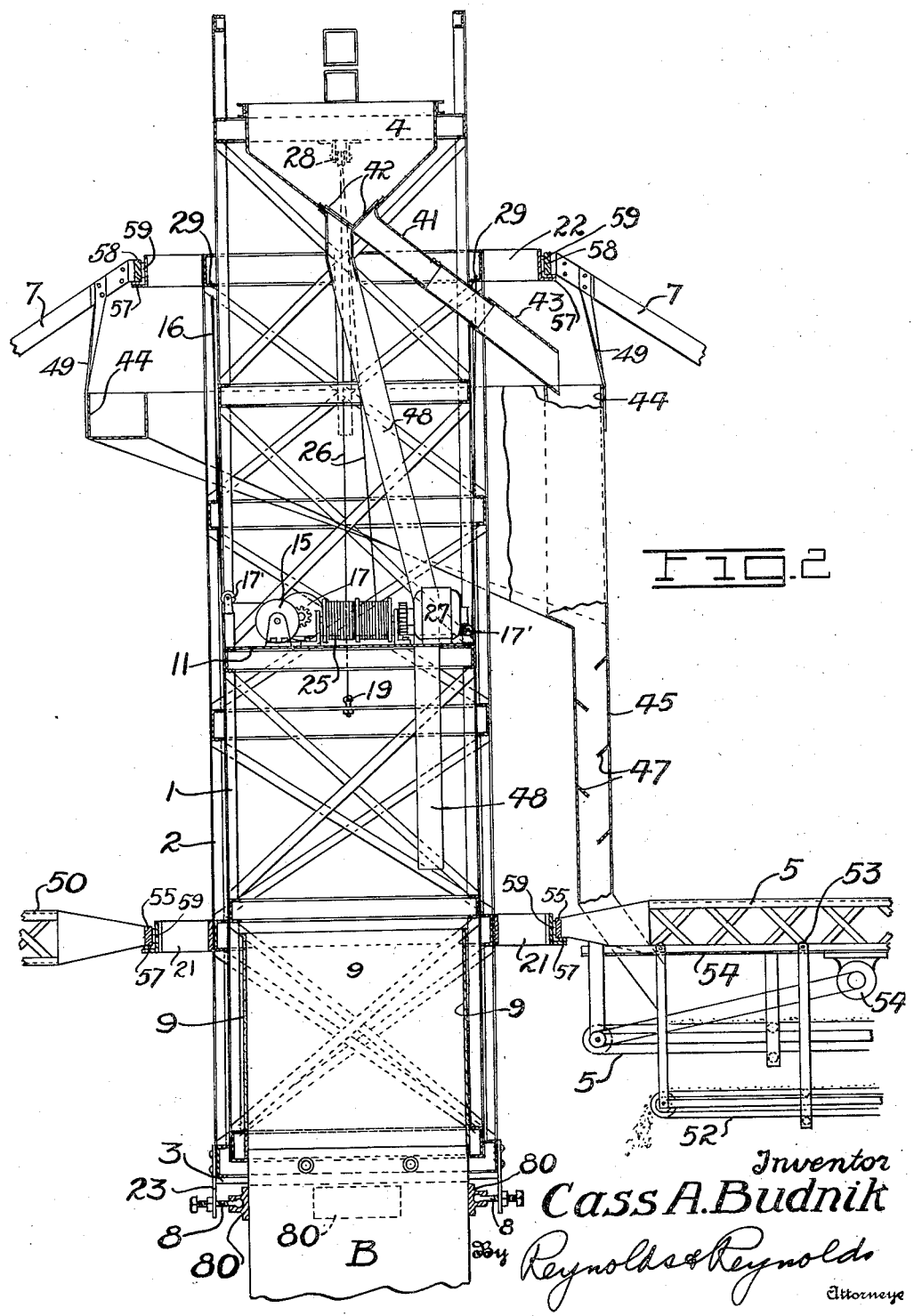

Dec. 22, 1931.   C. A. BUDNIK   1,837,525
DAM BUILDING TOWER
Filed Oct. 21, 1929   4 Sheets-Sheet 3
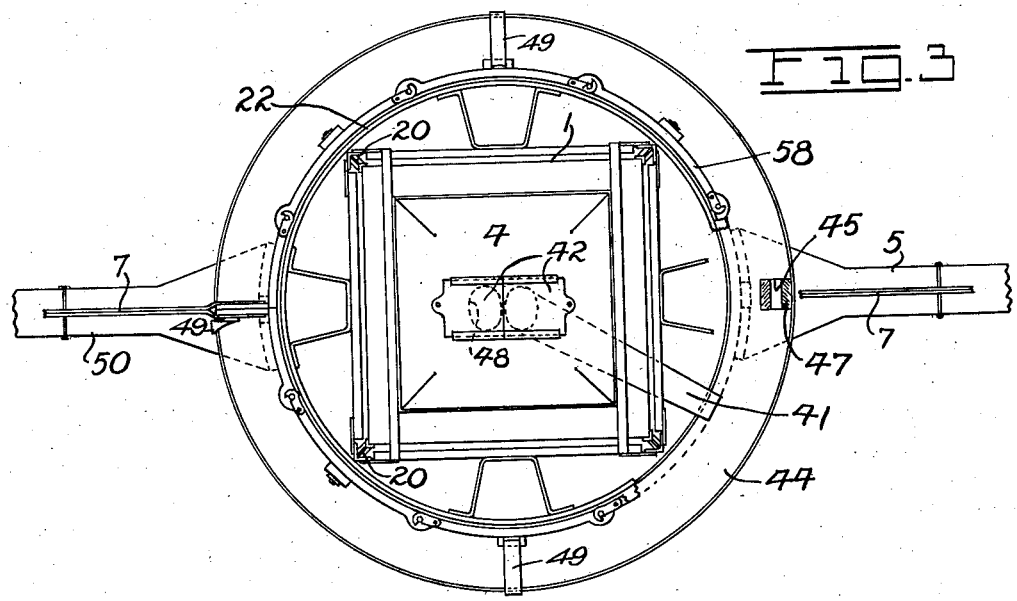
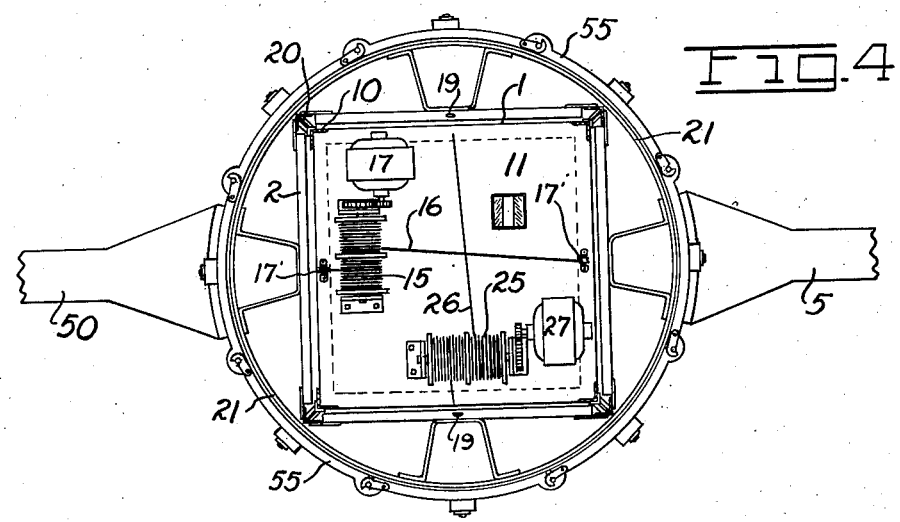
Inventor
Cass A. Budnik
By Reynolds & Reynolds
Attorneys Dec. 22, 1931.  C. A. BUDNIK  1,837,525
DAM BUILDING TOWER
Filed Oct. 21, 1929  4 Sheets-Sheet 4
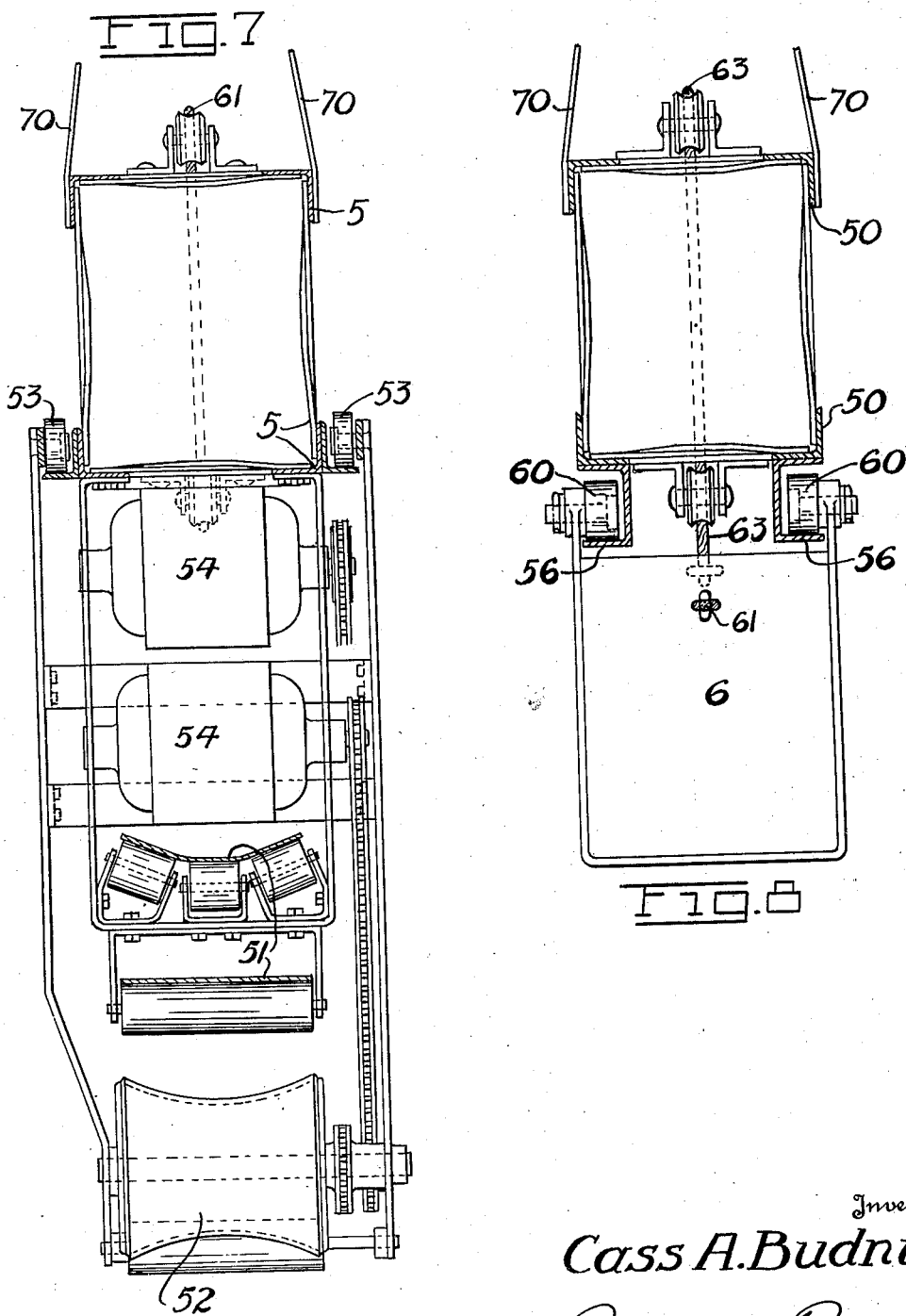
Inventor
Cass A. Budnik
By Reynolds & Reynolds
Attorneys Patented Dec. 22, 1931

1,837,525

UNITED STATES PATENT OFFICE

CASS A. BUDNIK, OF ROCKPORT, WASHINGTON

DAM BUILDING TOWER

Application filed October 21, 1929. Serial No. 401,177.

My invention relates to the building of dams, and is particularly concerned with the provision of a self-supporting tower for use in such projects. My invention relates to the same general invention as is disclosed and claimed in my co-pending application, Serial No. 390,232, filed September 4, 1929. This application is particularly concerned with the construction of the tower itself.

In the building of dams it is my intention, as disclosed in the previous application referred to above, to provide a series of towers positioned at intervals across the site of the dam, and connected by means of concrete conveyors with a concrete mixer, concrete being delivered to any selected tower in the line, and being distributed by this tower within its radius of action. Each tower is composed of two sections, one generally inside of the other, and so arranged that each section can be lifted from the other section, to be supported eventually upon a concrete block, which has been cast in place within the inner tower, so that the composite tower is lifted thus, step by step, as the level of the concrete within the dam site progresses upward.

It is a particular object of my present invention to provide a tower of the general character indicated, and by means of which the results outlined above can be accomplished.

It is a further object of my present invention to provide a tower of this general type, which will be simply and inexpensively constructed, but which will be sufficiently strong and rugged to withstand the usage to which it will be subjected.

It is a further object, particularly in association with this application, to provide means whereby such a tower may be approximately balanced at all times, thus eliminating the necessity for expensive guy lines or cables. Associated with and flowing from this object, it is a further object to provide concrete distributing mechanisms, located on or supported from the tower, which are adjustable inwardly and outwardly from the tower, and to provide counterweight means whereby the differing tendencies of these concrete distributing devices to tip the tower over will be counteracted and overcome.

It is a further object to provide a means for positively bracing and supporting the tower, without the use of guy wires.

My invention comprises the novel parts and the novel combination and arrangement thereof, as shown in the accompanying drawings, described in this specification, and as will be more particularly defined by the claims which terminates the same.

In the accompanying drawings I have shown my invention in a form which is now preferred by me, it being understood that various modifications in detail and in the arrangement of parts may be made within the scope of the claims forming part of this application.

Figure 1 is a general side elevation of my invention, shown in operation.

Figure 2 is a general side elevation of the tower itself, parts being broken away.

Figure 3 is a plan view of the tower itself.

Figure 4 is a transverse section through my device, taken just above the level of the working platform.

Figures 5 and 6 are detail sections of the upper and lower rings, respectively, showing the manner of support of the booms.

Figures 7 and 8 are sections on the respective lines 7—7 and 8—8 of Figure 1.

By reference to Figure 1 it may be seen that an outer tower section 2 is guided for vertical movement upon an inner tower section 1, the guides being shown as shoes 20 disposed at the corners and projecting inwardly from the outer tower section 2, these shoes being slidable along vertical guide ways 10 of the inner tower sections 1 (see Figures 3 and 4). These composite towers are supported from a suitable base, generally consisting of the concrete bearing block B, which has been previously cast in place, and through which projects supporting pins 3, on which the lower edges of the two sections 1 and 2 rest.

Within the inner tower section 1, and preferably somewhat below its top, is a working platform 11, whereon are mounted the means for raising the tower sections relative to each other. For this purpose I employ drums 15 and 25, respectively, each of which is preferably doubled, so that two lines 16 and 26 may be employed, and preferably two motors 17 and 27 are employed to control the operation of the respective drums 15 and 25.

The lines 16 pass from the drum 15 through pulleys 17' on the inner section 1, and thence upward to a connection at the upper part of the outer section 2, as indicated at 29 (see Figure 2). The line 26 passes from its drum over a pulley 28 in the upper portion of the inner section 1, and thence downward to a connection at 19 with the outer section 2. By the arrangement described, winding in on the drum 25 will cause the outer section 2 to be raised relative to the inner section 1, the latter resting on the pins 3, while operation of the drum 15 to wind in the lines 16 will cause upward movement of the inner section 1 relative to the outer section 2.

In the upper portion of the tower, and preferably within the inner section 1, is supported a receiving hopper 4, to which concrete is delivered in any way, as shown by conveyor 40. From the receiving hopper 4 leads a chute 41, the entrance to which is closed by a suitable gate valve 42, and the end of which is preferably telescoping, as indicated at 43, so it may be withdrawn inside of the confines of the inner section 1, when that section is to be raised relative to the section 2. The chute 41 delivers to an annular chute 44, which may be termed the distributing chute. This is supported by arms 49 from a brace 7 or ring 58 to be described later, and is revoluble about the tower. Preferably it has a sloping bottom, and terminates in a distributing chute 45, within which may be the customary baffles 47 to prevent segregation of the aggregates, and by means of which chute 45 the concrete is placed in position or delivered to distributing devices which will be described later. It should be noted that a conveyor 46 is supported in the upper part of the inner section 1, opposite the feed conveyor 40, and at times there may be a bridge arranged between these two conveyors, so that concrete delivered by the conveyor 40 will be carried over directly and deposited upon the conveyor 46, to be conveyed thereby to a tower farther along the line.

Since it is desirable that means be provided to distribute concrete about and within a circle of considerable radius, say fifty feet from the center of the tower, there must be provided such means as the booms 5 and 50, supported from the tower and revoluble thereabout, on which booms, or on at least one of which, are supported concrete distributing devices typified by the conveyors 51 and 52. While the conveyor 51, which is short, may be fixed in position, the conveyor 52 is ordinarily supported upon rollers 53, rolling upon a track 54 upon the boom 5, by means of which it may be moved outwardly to the extreme limit of the boom, or inwardly to distribute concrete close to the concrete block B. These conveyors are preferably self-contained units, operating from drive motors 54.

When the conveyor 52 is in its extreme outermost position, as indicated in Figure 1, or indeed, in any possible position, its weight and the weight of the concrete supported by it and by the conveyor 51 and chute 44, constitutes a considerable item, which if unbalanced would tend to throw the tower over. To counteract this tendency I provide a counterweight 6, which is supported upon rollers 60 running upon a track 56 upon the boom 50. Since it would involve the human element, and possibly failure to operate devices properly, if the counterbalancing were left to the control of the operator, I have preferred to connect the conveyor 52 and the counterweight 6 for conjoint movement, but in opposite directions. A line 61 runs from the outer end of the conveyor 52, over suitable guide pulleys, to a drum 62, and after being wound thereon passes to the inner end of the counterweight 6. As this is wound in to draw outward the conveyor 52, it is simultaneously paid out to permit outward movement of the counterweight 6. A second line 63 extends from another drum in alignment with the drum 62 to the outer end of the counterweight 6, and to the inner end of the conveyor 52, to complete the connection of the conveyor and counterweight.

The booms 5 and 50 are revolubly supported for movement about the tower 1, 2. To this end a flanged ring 21 is supported at the lower portion of the outer section 2, and about this is fitted a ring 55 supported upon rollers 57. The ends of the booms 5 and 50 are connected to the ring 55. To support and brace the outer ends of these booms a second ring 22 is supported at the upper end of the outer section 2, and about this fits a ring 58. Lateral thrust rollers 59 hold the ring 58 outward from the ring 22. The ring 58 would be provided, ordinarily, with supporting rollers 57, and the ring 55 ordinarily would have the radial bearing rollers 59. From the upper ring 58 are supported braces 7, running to the outer ends of the booms 5 and 50, and provided with transverse or vertical braces 70 of any suitable form and design. Sway braces, which may consist of cables 71, are also shown, these extending from the ends of the booms 5 and 50 to the outside point of the upper rings 58, these forming, with the braces 7, a triangle which maintains the booms in substantial rigidity.

It will thus be obvious that a tower constructed after the manner described can be kept substantially in balance, but in order to insure that it will not be tipped over by concentration of too much weight or force at one unbalanced point, I prefer that the outer tower section have a flange 23, depending beneath its lower edge, and that there be threaded in this flange a jack screw 8. This jack has a block 80 swiveled in its inner end, and adapted to bear against the face of the concrete block B, and to press inward against the same. Using opposite jacks, that is, upon the four sides, it is possible to clamp the outer tower section 2 securely to the concrete block B, and in this manner to prevent any tipping over of the tower. Other positive holding means might be employed in lieu of the jack screws.

The inner section 1 is made sufficiently larger than the bearing block B that there can be inserted therein concrete forms or plates, as indicated at 9 (see Figure 2). These are suitably supported in place, and may be removable or not, as may be required by conditions. Their purpose is to enable the casting in place of a block upon the block B which supports the tower, the concrete for such a block being supplied by means of a chute 48, leading from the receiving hopper. By this or like means it is possible to have ready a block which will support the tower when it is next moved upward, operating according to the method set forth in my copending application referred to above.

What I claim my invention is:

1. A dam building tower comprising, in combination, an inner and an outer tower section, guide means permitting telescoping of each section relative to the other, means within the inner section for casting a concrete supporting block, means for raising each section relative to the other and relative to a previously cast concrete block, and means for supporting the sections in upraised position from the previously cast concrete block.

2. A dam building tower as in claim 1, the section-raising means, including two drums, supported on the inner section, and two cables extending from the respective drums to the two sections.

3. A dam building tower as in claim 2, a platform upon the inner tower, below its top and the section raising means including two drums, on said platform and means for driving them, and two cables and guide pulleys therefor, one cable extending from its drum under a pulley on the inner tower to connect with the upper portion of the outer tower, and the other cable extending from its drum over a pulley at the upper part of the inner tower to a connection with a lower part of the outer tower.

4. A dam building tower as in claim 1, including means connecting the supporting block and the tower to positively steady the latter.

5. A dam building tower as in claim 1, and means for steadying the same comprising a plurality of jacks threaded in opposite sides of the outer tower, below the upper edge of the supporting concrete block, and projecting laterally to engage such block.

6. A dam building tower comprising, in combination, a pair of complemental tower sections, means for raising each section from and relative to the other, means associated with the tower for receiving and distributing concrete including a supply hopper with necessary valves and chutes supported on one tower section and an annular hopper revolubly mounted on the other section and receiving concrete from the supply hopper and a distributing chute leading from the annular hopper.

7. A dam building tower as in claim 1, an upper and a lower ring supported from the outer tower, two booms and corresponding braces revolubly supported upon said rings, projecting at opposite sides of the tower, concrete distributing devices movable lengthwise of one of said booms, a counterweight movable lengthwise of the boom, and means connecting the distributing devices and the counterweight for conjoint but opposite movements.

8. A dam building tower as in claim 1, an upper and a lower ring supported from the outer tower, two booms and corresponding braces revolubly supported upon said rings, projecting at opposite sides of the tower, concrete distributing devices movable lengthwise of one of said booms, a counterweight movable lengthwise of the boom, and means connecting the distributing devices and the counterweight for conjoint but opposite movements, a receiving hopper supported in the inner tower, an annular distributing hopper supported about the outer tower, and revoluble with the booms and braces, a chute leading from the receiving hopper to the distributing hopper and a second chute leading from the distributing hopper to the said distributing devices.

Signed at Rockport, Washington this 11th day of October 1929.

CASS A. BUDNIK.